United States Patent
Hori et al.

[19]

[11] Patent Number: 5,905,994
[45] Date of Patent: May 18, 1999

[54] MAGNETIC DISK CONTROLLER FOR BACKING UP CACHE MEMORY

[75] Inventors: Masanori Hori; Seiichi Abe, both of Odawara, Japan

[73] Assignee: Hitachi, Ltd., Tokyo, Japan

[21] Appl. No.: 08/759,459

[22] Filed: Dec. 5, 1996

[30] Foreign Application Priority Data

Dec. 7, 1995 [JP] Japan .................................... 7-319294

[51] Int. Cl.$^6$ ....................................................... G06F 13/00
[52] U.S. Cl. ............... 711/113; 395/750.02; 395/750.08; 395/750.06
[58] Field of Search ............................ 395/182.12, 182.2, 395/750.02, 750.06, 750.08; 711/113, 154

[56] References Cited

U.S. PATENT DOCUMENTS

| | | | |
|---|---|---|---|
| 5,007,027 | 4/1991 | Shimoi | 365/229 |
| 5,313,612 | 5/1994 | Satoh | 711/162 |
| 5,353,430 | 10/1994 | Lautzenheiser | 711/117 |
| 5,448,719 | 9/1995 | Schultz | 395/182.03 |
| 5,574,920 | 11/1996 | Parry | 395/750.08 |
| 5,649,156 | 7/1997 | Vishlitzky | 711/136 |
| 5,692,204 | 11/1997 | Rawson | 395/750.08 |
| 5,754,868 | 5/1998 | Yamamoto | 395/750.01 |
| 5,765,001 | 6/1998 | Clark | 395/750.08 |
| 5,828,823 | 10/1998 | Byers | 395/182.22 |

FOREIGN PATENT DOCUMENTS

| | | |
|---|---|---|
| 0573307 | 12/1993 | European Pat. Off. . |
| WO9215933 | 9/1992 | WIPO . |

*Primary Examiner*—Tod R. Swann
*Assistant Examiner*—Christopher S. Chow
*Attorney, Agent, or Firm*—Antonelli, Terry, Stout & Kraus, LLP

[57] ABSTRACT

A magnetic disk sub-system provides for sudden cutting off of a main power supply such as a power failure so that the backup by battery is effected to supply electric power to the cache memory from a battery upon cutting off of the main power supply in order to protect data in the cache memory and when the main power supply is cut off by operation of a main power supply switch the backup by battery is stopped to cut off supply of electric power to the cache memory from the battery after data in the cache memory is written into a magnetic disk unit and supply of electric power from the main power supply is then cut off. Further, the magnetic disk sub-system divides the cache memory into several portions so that the backup by battery can be controlled independently to thereby extend the backup period.

12 Claims, 6 Drawing Sheets

MAGNETIC DISK CONTROLLER FOR BACKING UP CACHE MEMORY

BACKGROUND OF THE INVENTION

The present invention relates to a magnetic disk controller for controlling data transfer between magnetic disk units constituting external storage apparatuses and a main memory unit of a higher rank apparatus and more particularly to data protection in a cache memory for temporarily holding data transferred between the magnetic disk units and the main memory unit.

As compared with a reading speed of information from a magnetic disk and a writing speed of information into the magnetic disk, a reading and writing speed of information to a cache memory constituted by a random access memory (RAM) is vary fast. Accordingly, by adding a cache memory to a magnetic disk controller for controlling data transfer between the magnetic disk units and the higher rank apparatus, an access time to the higher rank apparatus can be reduced greatly.

In this case, when data is read from the magnetic disk units to the higher rank apparatus, a magnetic disk control unit transfers data from a cache memory to the higher rank apparatus directly when the data is stored in the cache memory. When the data is not stored in the cache memory, the higher rank apparatus and a bus are once released after reception of an instruction and the data is then written into the cache memory from the magnetic disk. Thereafter, the higher rank apparatus and the bus are connected again and the data is transferred from the cache memory to the higher rank apparatus.

Further, when data is to be written into the magnetic disk units from the higher rank apparatus, the data is once written into the cache memory without writing the data into the magnetic disk directly and completion of the writing is reported to the higher rank apparatus when the data has been written into the cache memory. Then, the higher rank apparatus and the bus are released and thereafter the data in the cache memory is written into the magnetic disk to thereby shorten an occupancy time of the higher rank apparatus and the bus.

However, when the data is to be written into the magnetic disk units, the data is first written into the cache memory and then completion of the writing is reported to the higher rank apparatus. Accordingly, when a breaker is pulled down or when a plug receptacle is pulled out or when a power supply is suddenly cut off due to a power failure or the like before the data in the cache memory is written into the magnetic disk, he data written in only the cache memory disappears due to the volatility of the RAM used in the cache memory.

In order to cope with such a case, a battery is provided for the backup of the cache memory so that electric power is supplied from the battery to the cache memory directly to protect the data stored in the cache memory. In the prior art, however, a flag is stored to indicate that the data is stored in the cache memory and it is judged whether the cache memory is backed up by the battery or not.

In the conventional magnetic disk controller, if any data is stored in the cache memory when the power supply for the apparatus is cut off, the cache memory is backed up by the battery. Accordingly, even when the power supply is cut off by a main power supply switch (even when it is previously understood that the power supply is cut off), the data in the cache memory is not written into the magnetic disk and the cache memory is backed up by the battery, so that the battery for backup is continued to be used.

SUMMARY OF THE INVENTION

It is an object of the present invention to provide a magnetic disk controller in which backup by battery is electrically controlled to be performed and stopped and the backup by battery is not performed when a power supply is cut off by a main power supply switch, so that the number of times of the backup by battery can be reduced to thereby extend life of the battery.

In the magnetic disk controller of the present invention, the backup by battery can be electrically switched on and off and the backup by battery is adapted to be effected during the normal operation so that the backup by battery is always effected upon sudden failure of a power supply which is not caused by a main power supply switch.

When the power supply is cut off by the main power supply switch in the normal state, a magnetic disk control unit according to the present invention performs the destaging process for data in the cache memory and after it is confirmed that data which is not written in a disk is not stored in the cache memory, the backup by battery is electrically stopped by a program.

Further, when a voltage of the battery is reduced by discharge of the battery during the backup of the cache memory and the data in the cache memory cannot be held, the magnetic disk controller of the present invention can interrupt the backup to thereby prevent over-discharge of the battery and prevent that the battery cannot be used even if the battery is charged again.

The magnetic disk controller of the present invention has the configuration as described above and accordingly even when data is stored in the cache memory, the data is written in the disk before cutting off the power supply and the battery is disconnected, so that the number of times of the backup can be reduced and life of the battery can be extended as compared with the prior art method.

BRIEF DESCRIPTION OF THE PRESENT INVENTION

DESCRIPTION OF THE PREFERRED EMBODIMENTS

Figure 1:
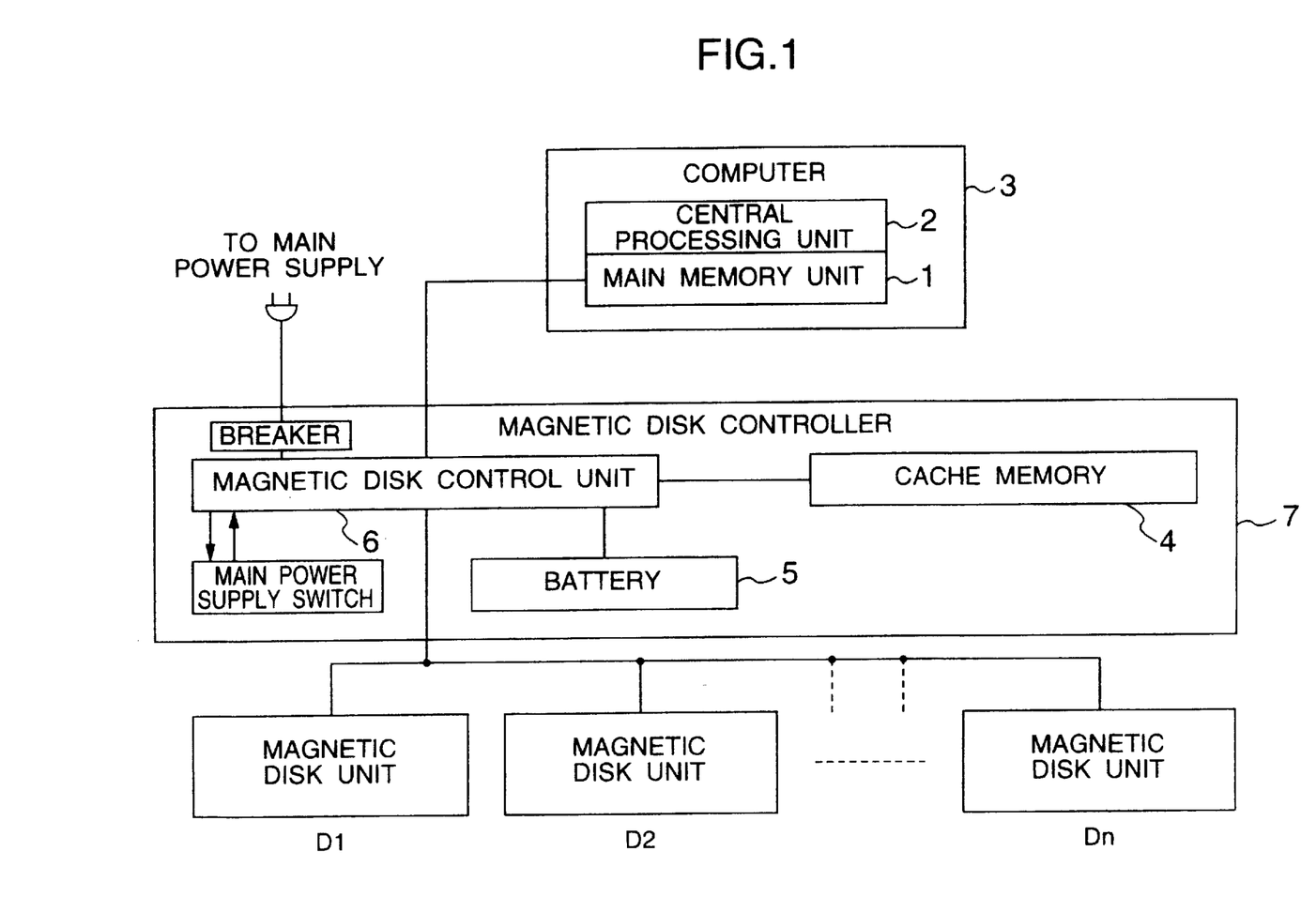
FIG. 1 schematically illustrates a computer system including a magnetic disk controller according to an embodiment of the present invention.

FIG. 1 is a schematic diagram illustrating a computer system including a magnetic disk controller according to an embodiment of the present invention. Numeral 1 denotes a main memory unit, and 2 a central processing unit. The main memory unit 1 and the central processing unit 2 constitute a higher rank apparatus 3. D1, D2, . . . , Dn denote magnetic disk units. Numeral 4 denotes a cache memory, 5 a battery used when a main power supply is off, and 6 a magnetic disk control unit for controlling transfer of information among the magnetic disk units, the higher rank apparatus 3 and the cache memory 4. The magnetic disk control unit 6, the cache memory 4 and the battery 5 constitute the magnetic disk controller 7. Further, a voltage of the battery is monitored by the magnetic disk control unit 6 and the battery is charged when the voltage thereof is reduced.

The magnetic disk control unit 6 writes data into the cache memory 4 in response to a writing instruction of the data to the magnetic disk from the higher rank apparatus 3 since the data can be written into the cache memory 4 at a high speed. When the data has been written into the cache memory 4, the magnetic disk control unit 6 reports completion of the writing to the higher rank apparatus 3. However, at this time, the write data is not written into the magnetic disk unit yet.

Figure 2:
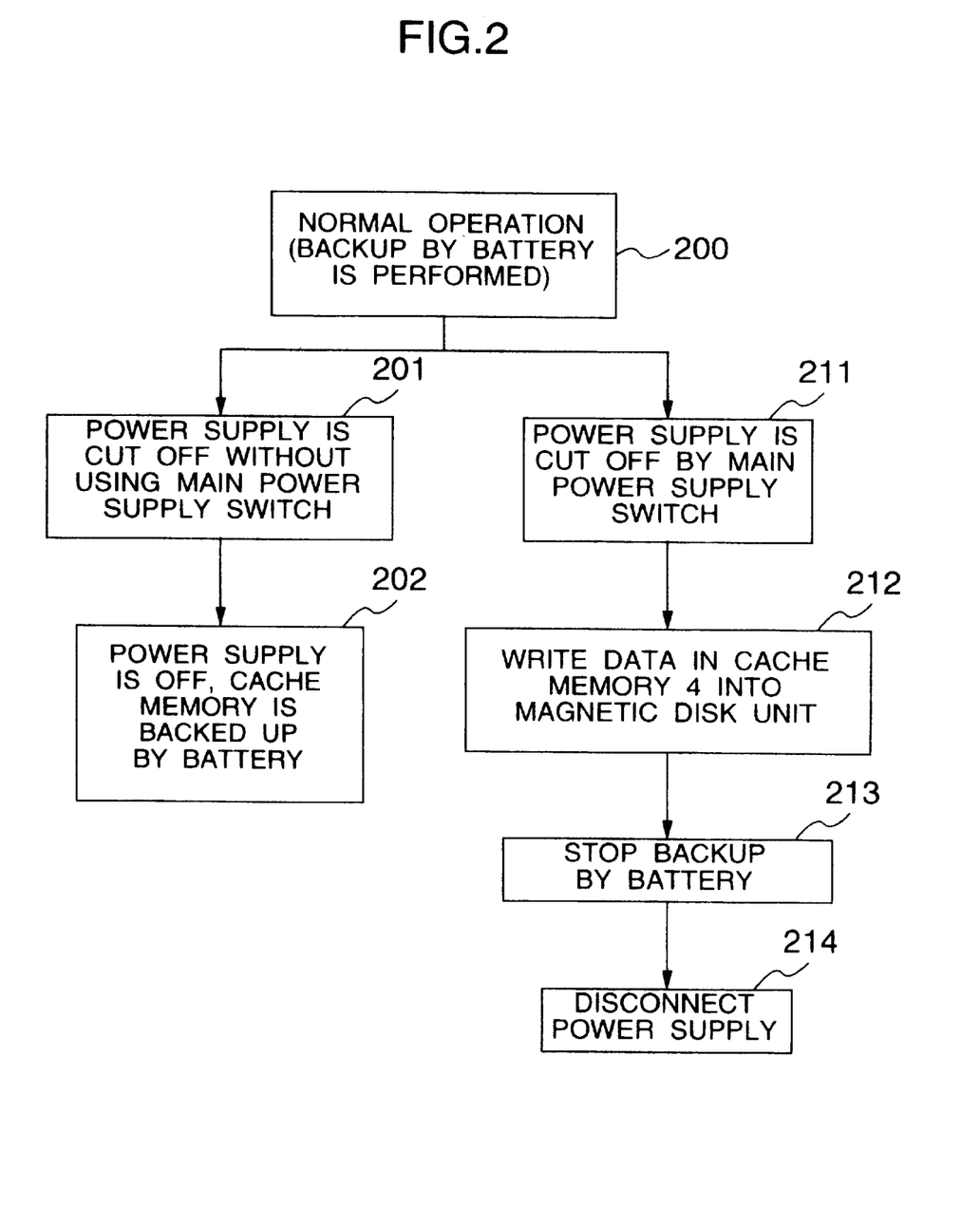
FIG. 2 is a flow chart showing a cutting-off operation of a power supply of the magnetic disk controller according to an embodiment of the present invention.

FIG. 2 is a flow chart showing operation of the magnetic disk controller according to the present invention when the power supply is cut off. The magnetic disk controller according to the present invention is set to make the backup by the battery in the normal operation (step 200). When the main power supply is cut off due to a power failure or the like without using the main power supply switch (step 201), data in the cache memory are backed up by the battery in order to protect the write data which is not written in the magnetic disk unit (step 202).

When data which are not written into the magnetic disk yet remain in the cache memory and the main power supply is cut off by means of the main power supply switch (step 211), the magnetic disk control unit 6 writes all the data remaining in the cache memory 4 into the magnetic disk unit without immediate disconnection or shortage of the power supply (step 212) and then stops the backup by the battery (step 13) to thereby disconnect the power supply (step 214). In this case, since the data have been written into the magnetic disk unit from the cache memory before disconnection of the power supply, it is not necessary to back up the cache memory by the battery. Accordingly, in such a state, the battery is dissipated by the backup of the cache memory uselessly.

Further, when the backup by the battery is continued for a long time, the battery is discharged excessively and cannot be sometimes used again even if the battery is charged again. Accordingly, when the power supply is cut off by the main power supply switch, the magnetic disk control unit 6 writes all the data in the cache memory into the magnetic disk and then stops the backup by the battery. The main power supply for the magnetic disk units and the magnetic disk controller is cut off.

Figure 3:
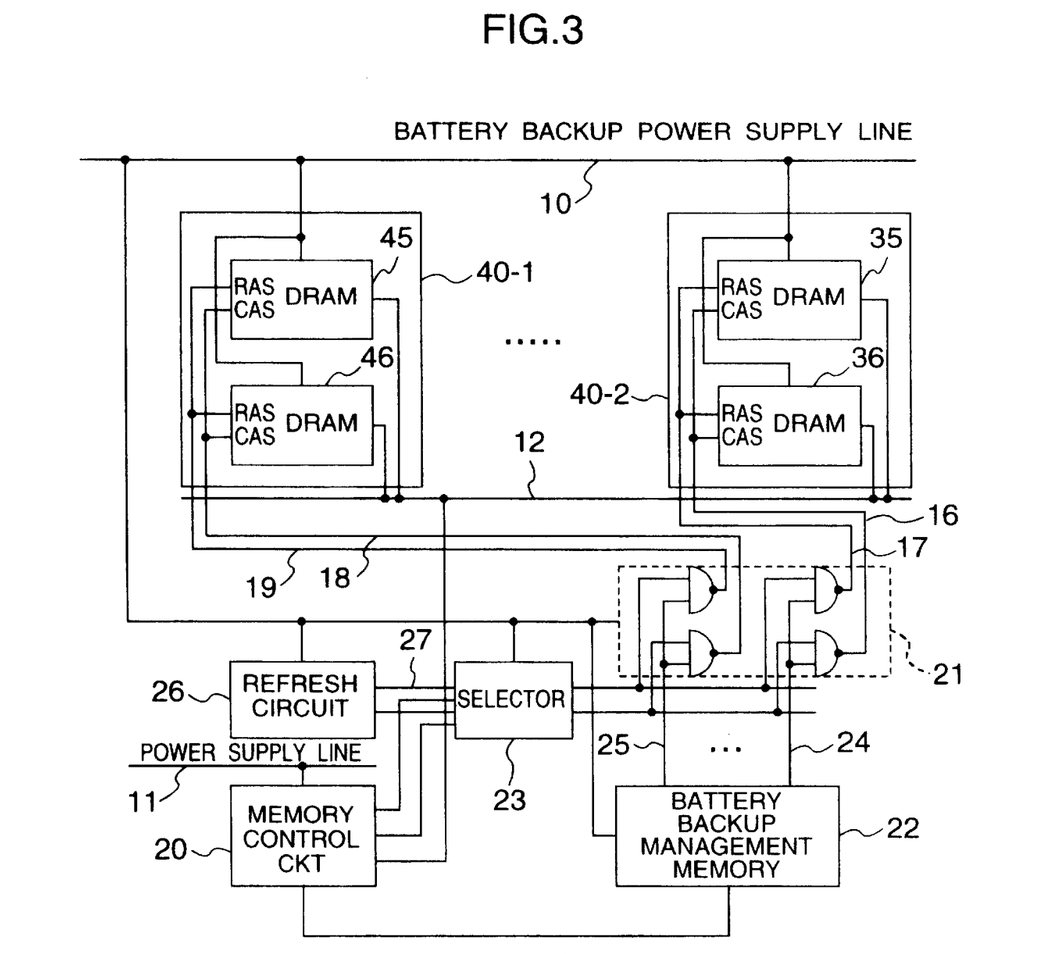
FIG. 3 is a block diagram schematically illustrating a cache memory and a magnetic disk control unit of the magnetic disk controller according to an embodiment of the present invention.

FIG. 3 is a schematic diagram illustrating the cache memory 4 and the magnetic disk control unit 6 according to the embodiment of the present invention. Memory modules 40-1 and 40-2 are general DRAM memory modules. The magnetic disk control unit 6 includes, as a circuit for backing up the DRAM 41 by the battery, a refresh circuit 26, a selector 23, a battery backup management memory 22, and NAND gates 21 for setting RAS-CAS signals 16, 17, 18 and 19 to the standby state when the backup by the battery is not performed. These circuits are backed up by the battery through a battery backup power supply line 10.

When the main power supply is turned on, a memory control circuit 20 which is supplied with electric power through the normal power supply line performs reading and writing of the DRAM. When write cache data is written into the memory module, the memory control circuit 20 sets the battery backup management memory 22 so that the backup by the battery is performed. When the write cache data is written into the magnetic disk unit, the memory control circuit 20 resets the battery backup management memory 22.

When the main power supply is off, the refresh circuit 26 produces a pulse 27 for CBR refresh and the selector 23 selects an output of the refresh circuit 26. When signals 24 and 25 of the battery backup management memory are 1, the NAND gates 21 transmit a refresh signal to the memory modules 40-1 and 40-2. When the signals are 0, the NAND gates set the RAS-CAS signals 16, 17, 18 and 19 to a high level so that the memory modules 40-1 and 40-2 are set to the standby state and are not refreshed.

More particularly, the signals 24 and 25 of the battery backup management memory are 1 when the main power supply is on, while when the main power supply is off, the signals 24 and 25 are changed depending on contents of the memory. When write data is stored in the memory, the signals are 1 and when read data or no data is stored in the memory, the signals are 0. Thus, only the DRAM module in which write cache data is written is refreshed and remaining modules are in the standby state, so that the power consumption is reduced and consumption of the battery is reduced. Further, in the present invention, since it is not necessary to add a circuit for controlling the backup by battery to the power supply line, variation of the power supply voltage is effectively reduced in the memory such as the DRAM in which a large power supply current flows in a moment such as a refresh.

Figure 4:
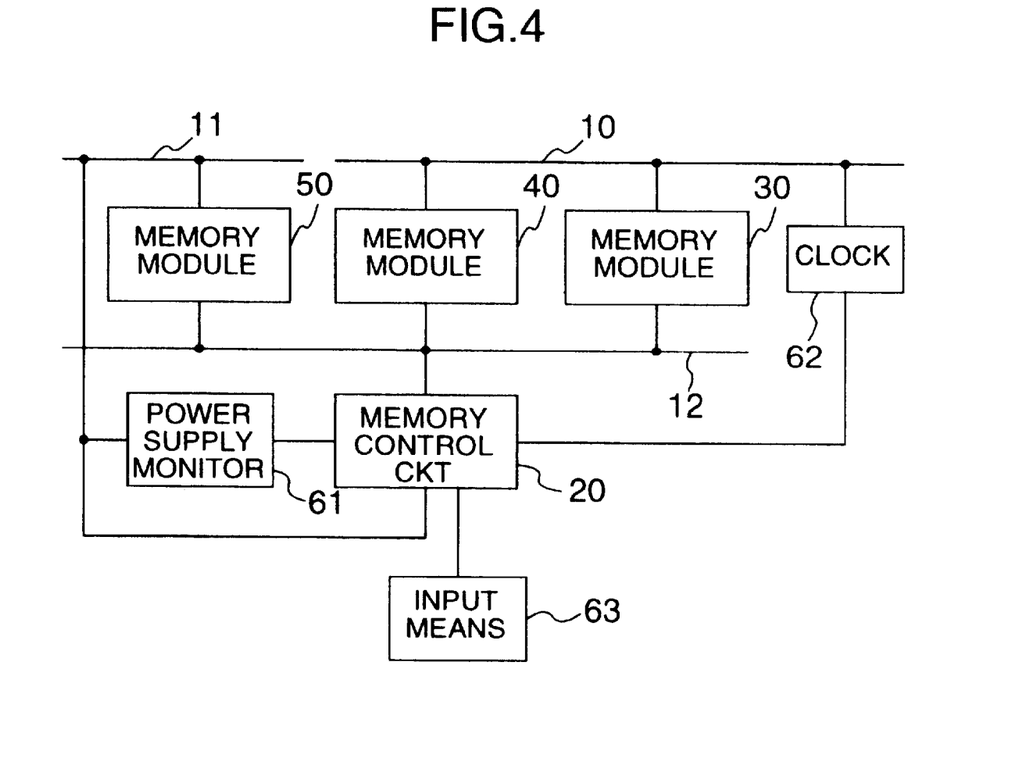
FIG. 4 is a block diagram schematically illustrating a cache memory and a magnetic disk control unit of the magnetic disk controller according to another embodiment of the present invention.

FIG. 4 is a schematic diagram illustrating a cache memory and a magnetic disk control unit according to another embodiment of the present invention. In this embodiment, the memory modules are divided into a memory module group 30 which is backed up by the battery, a memory module group 40 which is backed up by the battery under control of the memory control circuit 20, and a memory module group 50 which is not backed up by the battery. The memory module group 30 is connected to the battery backup power supply line 10 and all of memory modules thereof are backed up. The backup of the memory module group 40 is controlled by the circuit as shown in FIG. 3 and only the memory module in which write data is stored is backed up. In FIG. 4, circuits other than the memory control circuit 20 are omitted for clarification of the drawing. The memory module group 50 is connected to the normal power supply line 11 and is not backed up by the battery. In addition, in this embodiment, a power supply monitoring circuit 61 and a clock 62 are provided. In other words, it is premised that the module in which write cache data is written is backed up and the module in which read cache data is written is not required to be backed up.

The memory control circuit 20 determines a ratio of using the write cache memory requiring the backup by battery on the basis of a value of the clock 62 when the power supply monitoring circuit detects the normal power supply voltage. For example, in the case of an application having a low use ratio at night and in a holiday and requiring a time for recovery upon a power failure, the use ratio of the write cache memory is automatically set to be low at night and in a holiday. Alternatively, a set value of the use ratio may be inputted to the memory control circuit 20 by means of input means 63. The memory control circuit 20 does not use the memory module group 40 as the write cache memory at night and in a holiday by the above setting. Accordingly, even when a power failure occurs during use, a current consumed by the backup by battery is low and accordingly disappearance of data can be prevented.

Further, in the normal operation, the memory module group 40 can be used as the write cache memory and accordingly the performance can be maintained. In the embodiment, since only the necessary memory module can be controlled to be backed up by the battery, the power consumption of the backup by battery can be reduced as compared with when all the same memory modules used are backed up and an amount of hardware for control of the backup by battery can be reduced.

Figure 5:
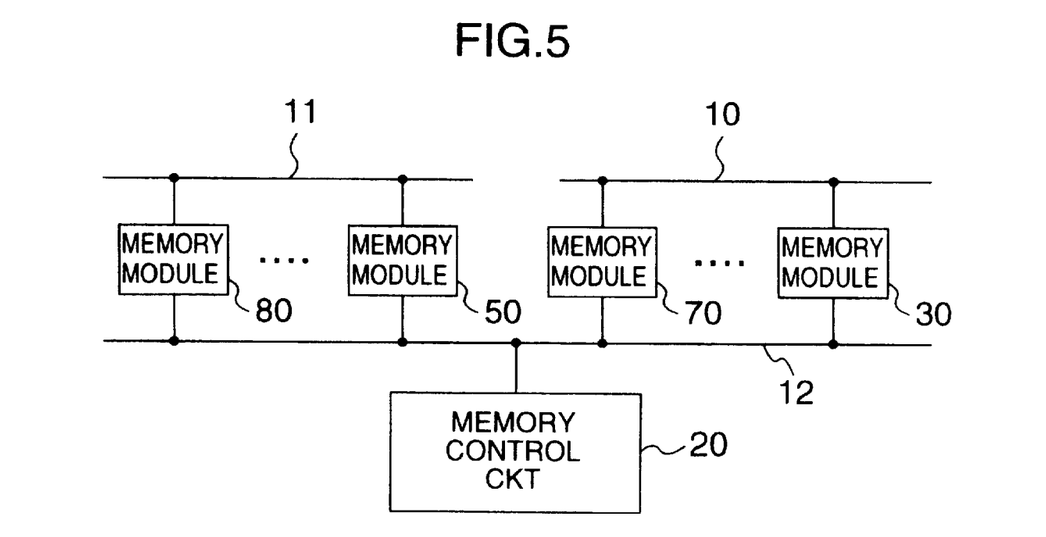
FIG. 5 is a block diagram schematically illustrating a cache memory and a magnetic disk control unit of the magnetic disk controller according to still another embodiment of the present invention.
Figure 6:
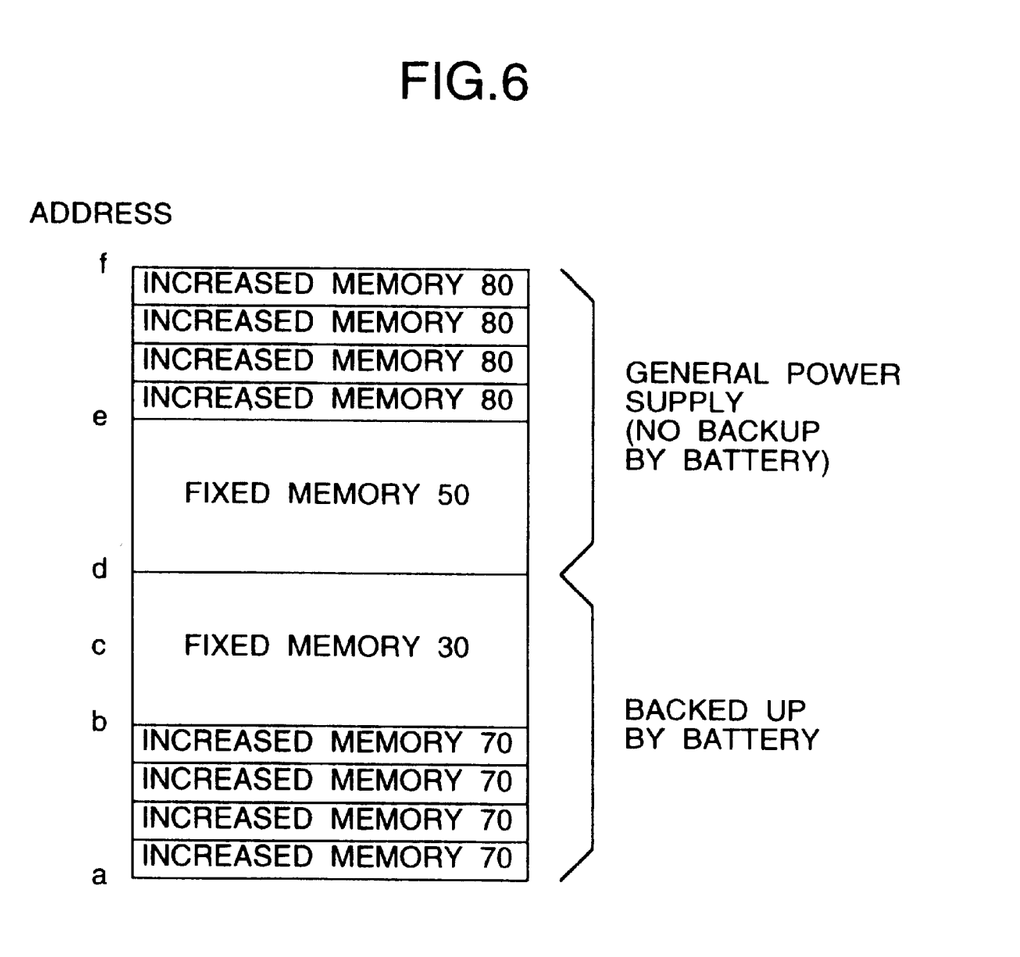
FIG. 6 is a memory map diagram of the cache memory of the magnetic disk controller of FIG. 5.

FIG. 5 is a schematic diagram illustrating the cache memory 4 and the magnetic disk control unit 6 according to still another embodiment of the present invention. FIG. 6 shows a memory map of the cache memory of the embodiment of FIG. 5. In the embodiment, the memory modules are divided into memory module groups 30 and 70 which are backed up by the battery and memory module groups 50 and 80 which are not backed up by the battery. The memory modules which are backed up by the battery are used as the write cache memory and the memory modules which are not backed up by the battery are used as the read cache memory.

More particularly, addresses b to d of the memory map of FIG. 6 are used for the write cache memory and addresses d to e are used for the read cache memory. Thus, the cache memory having small consumed current for the backup by battery can be configured.

Figure 7:
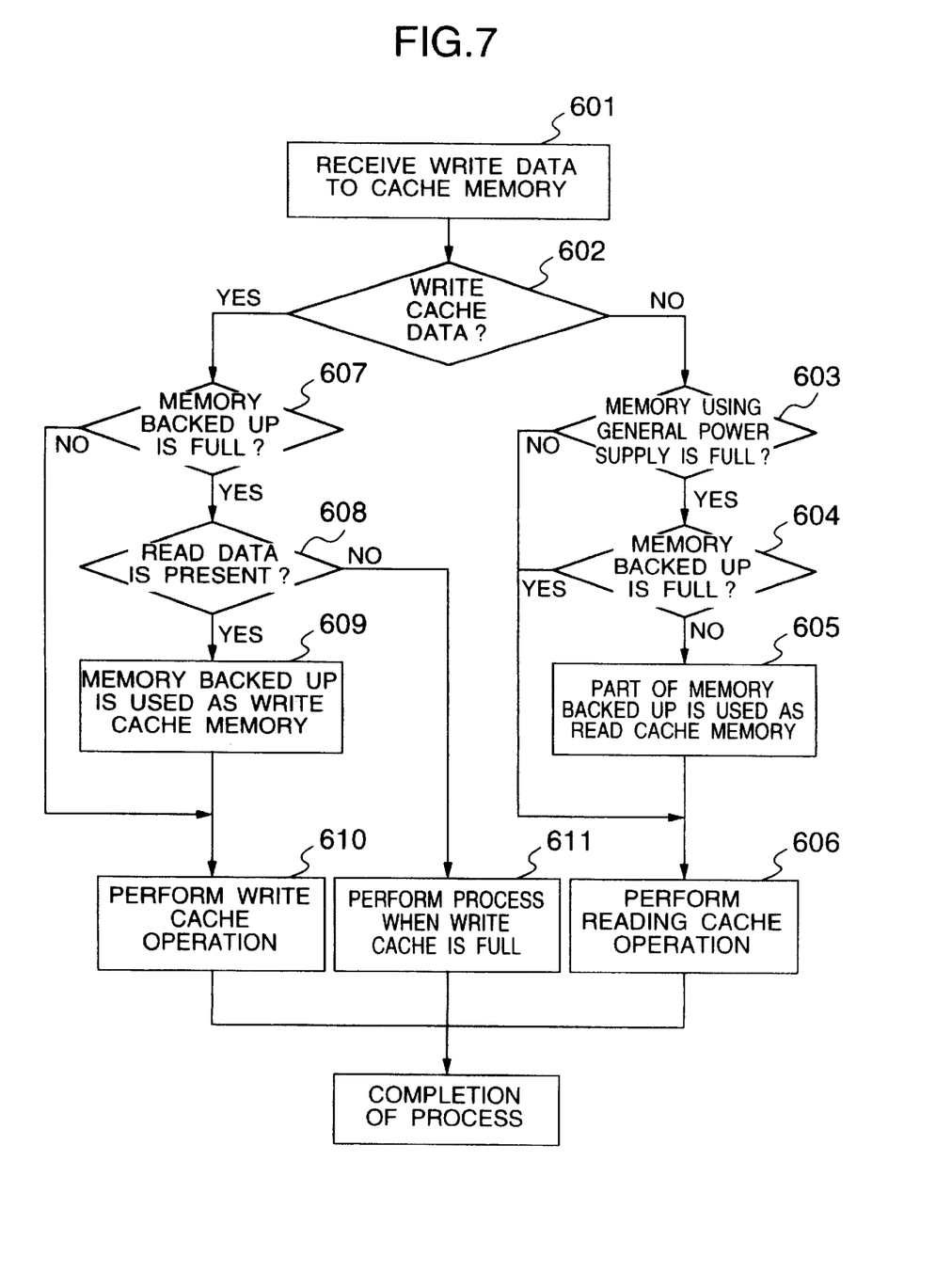
FIG. 7 is a flow chart showing operation of the cache memory of the magnetic disk controller of FIG. 5.

However, when read data are increased, there is a case where the capacity of the read cache memory is lacking and the performance is reduced. Accordingly, the disk controller according to the embodiment of the present invention controls the cache memory in accordance with the flow chart shown in FIG. 7. In the flow chart of FIG. 7, when the disk control unit receives write data to the cache memory (step 601), the disk control unit judges whether the data is the write cache data or the read cache data (step 602). When the data is the read cache data, the disk control unit judges whether the memory using the general power supply (memory which is not backed up by battery) is full or not (step 603). When the memory is full, the disk control unit judges whether the memory backed up by the battery is full or not (step 604). When the memory is not full, a part of the memory backed up by the battery is used as the read cache memory (step 605) and the read cache operation for writing the read data into the cache memory is performed. Further, in step 602, when the data is the write data, the disk control unit judges whether the memory backed up by the battery is full or not (step 607). When the memory backed up by the battery is not full, the write cache operation for writing the write data into the cache memory is performed (step 610). When the memory backed up by the battery is full, the disk control unit judges whether the read data is present between the addresses b and d of FIG. 6 or not (step 608). When the read data is present, the write data is written thereon in a memory location of the address of the read data (steps 609, 610). Further, when the read data is not present between the addresses b and d of FIG. 6, the write cache data on the cache memory is written in the magnetic disk. In this manner, the disk control unit performs the predetermined process when the write cache memory is full (step 611).

In the magnetic disk sub-system according to the embodiment, when the memory backed up by the battery is not used as the write cache memory, the disk control unit 6 controls to use the memory as the read cache memory. In other words, the addresses b to c of the memory map of FIG. 6 are used as the write cache memory and the addresses c to e are used as the read cache memory. Further, when the write cache memory is full, the write data is written on the read data in the memory backed up in which the read data is stored. Thus, the read cache memory can be increased or extended, so that the performance can be ensured. Particularly, by setting addresses of mounted memory modules adjacent to each other, address space can be formed continuously and accordingly control is made easily.

As described above, according to the present invention, the backup of the cache memory by the battery can be exactly controlled to be performed and stopped to thereby effect saving the power consumption, extension of the backup period, prevention of over-discharge of the battery and the like.

We claim:

1. A magnetic disk controller comprising:

a magnetic disk control unit for controlling transfer of data between a higher rank apparatus and a plurality of magnetic disk units for storing data for said high rank apparatus, wherein said magnetic disk control unit sets a ratio of a number of memory modules which are backed up and a number of memory modules which are not backed up of a second memory module group;

a cache memory for temporarily storing data transferred between said higher rank apparatus and said plurality of magnetic disk units and including a first memory module group, a second memory module group and a third memory module group;

a power supply;

a battery for backing up said cache memory upon power failure;

a switch for cutting off said power supply; and a timer wherein said magnetic disk control unit sets said ratio in accordance with a value of said timer, wherein said first memory module group is backed up by said battery, said second memory module group is controlled by said magnetic disk control unit so that only a memory module of said second memory module group in which write data is stored in backed up, and said third memory module group is connected to said power supply.

2. A magnetic disk controller according to claim 1, wherein said magnetic disk control unit includes a battery backup management memory which is set when write data is written in said memory module of said memory module groups and is reset when said write data is written in said magnetic disk unit.

3. A magnetic disk controller according to claim 2, wherein said plurality of memory modules use DRAMs as memories and when said battery backup management memory is set, said magnetic disk control unit controls said memory modules to refresh said memory modules upon the backup by the battery.

4. A magnetic disk controller according to claim 3, wherein said battery backup management memory is backed up by said batter.

5. A magnetic disk controller according to claim 2, wherein said memory modules use DRAMs as memories and when said battery backup management memory is reset, said magnetic disc control unit controls RAS-CAS signals for said memory modules to be set to a standby state.

6. A magnetic disk controller according to claim 5, wherein said battery backup management memory is backed up by said batter.

7. A magnetic disk controller according to claim 1, wherein said magnetic disk control unit includes input means for inputting said ratio.

8. A magnetic disk controller comprising:
- a magnetic disk control unit for controlling transfer of data between a higher rank apparatus and a plurality of magnetic disk units for storing data for said higher rank apparatus, wherein said magnetic disk control unit sets a ratio of a number of memory modules which are backed up and a number of memory modules which are not backed up;
- a cache memory for temporarily storing data transferred between said higher rank apparatus and said plurality of magnetic disk units and including a first memory module group and a second memory module group;
- a battery for backing up said cache memory upon power failure;
- a power supply;
- a switch for cutting off said power supply; and
- a timer; wherein said magnetic disk control unit sets said ratio in accordance with a value of said timer,
- wherein said first memory module group is backed up by said battery and said second memory module group is connected to said power supply,
- said magnetic disk control unit controls so that write data is stored in said first memory module group, read data is stored in said second memory module group and when said second memory module is full, read data is stored in said first memory module group.

9. A magnetic disk controller according to claim 8, wherein said magnetic disk control unit controls so that, when read data is stored into said first memory module group, addresses of said first memory module in which said read data is stored are continued to addresses of said second memory module.

10. A magnetic disk controller according to claim 8, wherein said magnetic disk control unit controls so that, when write data is stored, said write data is written in an area in a memory module of said first memory module group, in which area read data is stored, if said first memory module group is full.

11. A magnetic disk controller according to claim 8, wherein said magnetic disk control unit includes a battery backup management memory which is set when write data is written in said memory module of said memory module groups and is reset when said write data is written in said magnetic disk unit.

12. A magnetic disk controller according to claim 8, wherein said magnetic disk control unit includes input means for inputting said ratio.

* * * * *